«12» United States Patent
Cheung et al.

«10» Patent No.: US 7,443,797 B2
«45» Date of Patent: Oct. 28, 2008

«54» MEDIUM STREAMING DISTRIBUTION SYSTEM

«75» Inventors: Gene Cheung, Musashino (JP); Takeshi Yoshimura, Yokohama (JP)

«73» Assignee: Hewlett-Packard Development Company, L.P., Houston, TX (US)

«*» Notice: Subject to any disclaimer, the term of this patent is extended or adjusted under 35 U.S.C. 154(b) by 580 days.

«21» Appl. No.: 10/506,882

«22» PCT Filed: Mar. 5, 2003

«86» PCT No.: PCT/JP03/02587

§ 371 (c)(1),
(2), (4) Date: Apr. 13, 2005

«87» PCT Pub. No.: WO03/075526

PCT Pub. Date: Sep. 12, 2003

«65» Prior Publication Data

US 2005/0180415 A1  Aug. 18, 2005

«30» Foreign Application Priority Data

Mar. 6, 2002 (JP) .............................. 2002-061017
Feb. 28, 2003 (JP) .............................. 2003-053733

«51» Int. Cl.
*H04L 1/00* (2006.01)
«52» U.S. Cl. ......................................... 370/236; 725/90
«58» Field of Classification Search ................. 370/216, 370/225, 227, 228, 229, 230, 230.1, 231, 370/232, 235, 236, 246, 248, 249, 315, 389, 370/394, 395.21, 338, 412, 428; 725/87, 725/90, 94
See application file for complete search history.

«56» References Cited

U.S. PATENT DOCUMENTS

| 5,812,531 | A | * | 9/1998 | Cheung et al. | ............... 370/255 |
| 6,584,153 | B1 | * | 6/2003 | Gordon et al. | ......... 375/240.13 |
| 6,643,496 | B1 | * | 11/2003 | Shimoyama et al. | ........ 455/69 |
| 6,823,010 | B1 | * | 11/2004 | Curet et al. | ........... 375/240.12 |

(Continued)

FOREIGN PATENT DOCUMENTS

| JP | 09-200188 | 7/1997 |
| JP | 11-098503 | 4/1999 |
| JP | 2003 032690 | 1/2003 |

OTHER PUBLICATIONS

H. Balakrishnan et al; "A Comparison of Mechanism for Improving TCP Performance over Wireless Links"; IEEE/ACM Trans. Networking, vol. 5, No. 6, Dec. 1997.

(Continued)

*Primary Examiner*—Ricky Ngo
*Assistant Examiner*—Wei-Po Kao

«57» ABSTRACT

A medium streaming distribution system reduces effects of packet loss in a network before the packet reaches radio base station. A medium distribution device for packet-transmits via the base station, a medium stream to the network by a real time transmission protocol. A packet analyzer monitors the packet arriving at the radio base station and transmits feedback information associated with loss of a packet to the medium distribution device. Based on the feedback from a relay device and a terminal device of the medium stream, the transmission rates from the medium distribution device to the relay device and from the relay device to the terminal device are obtained to provide a greater transmission rate in a surplus band for re-transmission or a forward error correction.

17 Claims, 8 Drawing Sheets

U.S. PATENT DOCUMENTS

| | | | | |
|---|---|---|---|---|
| 7,027,516 | B2* | 4/2006 | Anderson et al. | 375/240.26 |
| 7,224,702 | B2* | 5/2007 | Lee | 370/473 |
| 2002/0138846 | A1* | 9/2002 | Mizutani et al. | 725/93 |
| 2002/0191594 | A1* | 12/2002 | Itoh et al. | 370/352 |
| 2003/0091000 | A1* | 5/2003 | Chu et al. | 370/230 |

OTHER PUBLICATIONS

T. Yoshimura et al; "Rate and Robustness Control with RTP Monitoring Agent for Mobile Multimedia Streaming"; IEEE International Conference on Communications, New York, NY; Apr. 2002.

G. Cheung et al; "Streaming Agent: A Network Proxy for Media Streaming in 3G wireless Networks"; Packet Video Workshop, Pittsburg, PA; May 2002.

G. Cheung et al; "Rate-Distortion Optimized Application-level Retransmission Using Streaming Agent for Video Streaming over 3G Wireless Network"; IEEE International Conference on Image Processing, Rochester, NY; Sep. 2002.

G. Cheung et al; "Streaming Agent for Wireless Network/ Wireless Link Rate-mismatch Environment"; IEEE Workshop on Multimedia Signal Processing, St. Thomas, US Virgin Islands, Dec. 2002.

* cited by examiner

MEDIUM STREAMING DISTRIBUTION SYSTEM

TECHNICAL FIELD

The present invention relates to media streaming, and more particularly relates to streaming in a case where delay on a stream transmission path becomes larger mid-way through the transmission path, such as the case where a media stream is transmitted to a client via a last-hop wireless cellular link. Note that, though a wireless cellular link is taken as an example of the transmission path of a large delay in the following explanations, the present invention is not limited thereto.

BACKGROUND ART

In recent years, due to striking advances in communication technologies, it has become possible to perform multimedia delivery by means of wireless communication. In order for a client that receives wireless data delivery to playback multimedia in real time, QoS control over a communication path (transmission rate control and packet loss resilience control) become important.

Non-Patent Document 1, shown below, discloses that a wireless base station comprises an RTP monitoring agent after a shaping point (a flow control point). An RTP (Real-time Transfer Protocol) monitoring agent monitors a multimedia stream that arrives at the wireless base station and is to be transmitted via a wireless cellular link, and feeds back to a media server the information indicating the congestion status in a wired network from the media server to the wireless base station. The client that receives data packets wirelessly from the wireless base station transmits reception acknowledge information to the media server according to RTCP protocol.

The media server determines the congestion status in the wired network and the link error condition over the wireless link based on the information fed back from the RTP monitoring agent and the reception report from the client. When a packet loss has occurred due to the congestion in a wired network, the media server reduces the media stream transmission rate, and when packet loss has occurred due to an error in the wireless link, it increases the packet loss resiliency of the encoding of the media. The packet loss resiliency can be increased by, for example, increasing the rate of intra-frame coding in video encoding.

In this type of conventional technique, once a packet loss occurs, considerable time is required before packet loss resiliency is increased. In a case where packets containing an I-picture in a video stream is discarded by network queues in response to congestion in the wired network and packets of multiple subsequent P-pictures are then transmitted via a last-hop wireless link, the client is unable to reconstruct these P-pictures since the I-picture needed for reference to reconstruct the P-pictures is not available. Furthermore, even when a P-picture is discarded, no subsequent P-pictures dependent on that P-picture can be reconstructed until the next I-picture is received. In general TCP communications, a packet that is lost is retransmitted based on feedback information. However, in streaming where the media is reconstructed and played back in real time, retransmission may be too late in such a case where the buffer size of the client is small. When packets are discarded due to the congestion in a wired network, reconstruction errors occur not only for the discarded packet but also for the P-pictures contained in subsequent packets successfully received.

Therefore, there is a need to reduce the error propagation phenomenon where a packet loss occurring in the network upstream from the base station of a low-speed communication such as a wireless communication has an effect on reconstruction of the media contained in the subsequent packets.

DISCLOSURE OF THE INVENTION

A media streaming delivery system according to an aspect of the present invention comprises: a media delivery apparatus for transmitting a media stream in packets to a network according to a real time transfer protocol; and a wireless base station connected to the network for transmitting the media stream by a low-speed communication such as a wireless communication. The system further includes a packet analysis device for monitoring the packet arriving at the wireless base station, and transmitting feedback information relating to a packet loss to the media delivery device.

According to another aspect of the present invention, there is provided a media delivery apparatus included in the above-mentioned system.

According to an embodiment of the present invention, a packet analysis apparatus transmits a sequence number included in a packet header to the media delivery apparatus as feedback information.

Furthermore, in an embodiment of the present invention, the media delivery apparatus determines packet loss based on the feedback information and, depending on the determined packet loss, modifies the media stream so as to reduce the influence of the packet loss.

According to an embodiment of the present invention, the media stream is a movie including a sequence of I-pictures and P-pictures. The media delivery device includes a storage for storing a plurality of media streams for one movie including at least a first media stream including I-pictures in a first arrangement and a second media stream including I-pictures in a second arrangement which is different from the first arrangement.

The media delivery apparatus further includes switching means for, in response to the determination of the packet loss, for a destinated location where the loss has occurred, selecting a media stream in which the first I-picture after the picture in the lost packet appears earliest among the plurality of the media streams and switching the media stream to be sent to the selected media stream. This can reduce the error propagation phenomenon where a packet loss has an effect on play back of the media contained in the subsequent packet.

In an embodiment of the present invention, there are provided media streams with different frequencies of intra-frame coded I-pictures, and switching is made to the media stream with a higher frequency of I-pictures in response to packet loss.

Furthermore, according to another aspect of the present invention, the media delivery apparatus further includes an encoding device for generating the media stream. The encoding device is arranged to generate a media stream starting with an I-picture in response to the determination of packet loss.

According to an embodiment of the present invention, the encoding device increases the frequency of I-pictures at least for the media stream transmitted to the client where the loss has occurred in response to detection of the packet loss based on the feedback information from the packet analysis apparatus.

Furthermore, according to an embodiment of the present invention, the media delivery apparatus receives client feedback information regarding packet reception from a wireless terminal that is the destination of the media stream, and determines whether the packet loss has occurred in the wired transmission in the network or in the wireless transmission from the wireless base station based on the client feedback information and the feedback information from the packet analysis apparatus.

Furthermore, in an embodiment of the present invention, the media delivery apparatus performs packet retransmission based on the feedback information on the packet loss.

Furthermore, according to an embodiment of the present invention, a transmission rate from the media delivery apparatus to the relay apparatus and a transmission rate from the relay apparatus to the terminal are obtained based on the feedback from both the media stream relay device and the terminal, and a surplus band is used for retransmission or forward error correction on the side of greater transmission rate, thereby improving communication quality.

BEST MODE FOR CARRYING OUT THE INVENTION

Figure 1:
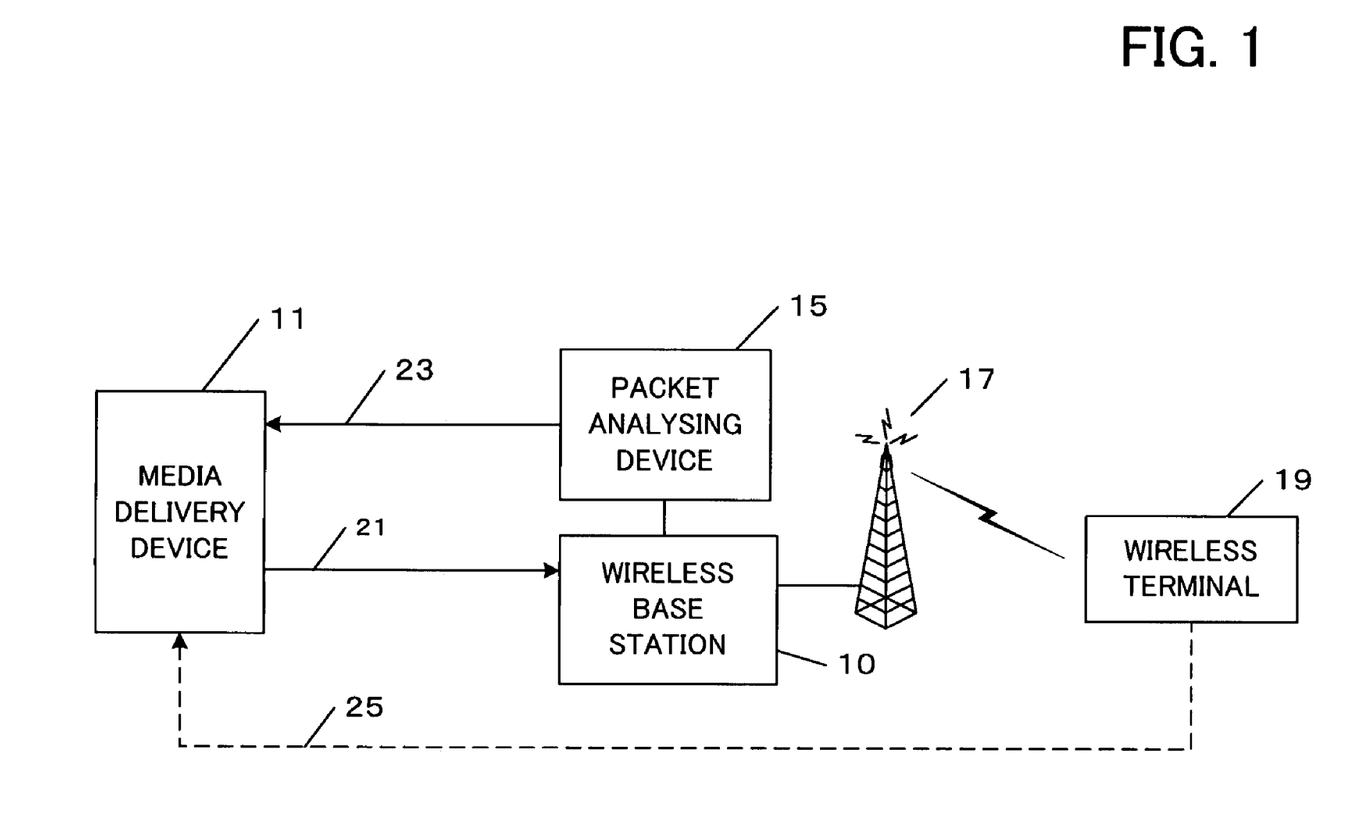
FIG. 1 is a block diagram showing concepts of an embodiment of the present invention☐.

Hereinafter, an embodiment of the present invention will be explained with reference to the drawings. FIG. 1 is a diagram showing an overall construction of an embodiment of the present invention. A media delivery device 11 performs real time delivery of multimedia. The multimedia includes images, audio, text, graphics, and the like, and streams of each are packet-transmitted, and are reconstructed and played back in real time by a receiving device. In the following explanations, these media are described with respect to a video stream. The media delivery device 11 can deliver the media stream in the form of on-demand video delivery, or in the form of a broadcast.

When a media delivery request comes from a wireless terminal 19 such as a mobile phone, a portable terminal (PDA), a computer provided with a wireless communication device, the media delivery device 11 packetizes the media stream, attaches an RTP (Real-time Transport Protocol) header and an IP header thereto, and transmits this via a wired network 21. The packets are routed according to an Internet Protocol (IP), and arrive at a wireless base station 10. The IP is a connectionless communication protocol, and when congestion occurs on the network, packets in overflowing network queues may be discarded from the network.

The wireless base station 10 transmits the packets received from the network 21 to the wireless terminal 19. According to the present invention, a packet analysis device 15 is provided to the wireless base station 10 and monitors the media stream packets that arrive at the wireless base station 10. The sequence of the media stream packets sent to a particular wireless terminal 19 can be identified by means of a pair of source and destination addresses included in the IP header and a pair of source and destination port numbers included in the UDP header. As will be explained in detail below, the RTP header is included in the packet, and the RTP header includes a sequence number that is unique to that packet in the media stream.

When detecting the flow of a sequence of packets having the same source addresses and destination addresses and also the same source port numbers and the destination port numbers, the packet analysis device 15 gives feedback (ACK) of the packet numbers contained in the RTP header, to the media delivery device. The media delivery device 11 can detect packet loss from this feedback information. When the media delivery device 11 detects that an I-picture packet was lost from the packet sequence numbers, the media format is switched to a format with a greater frequency of I-pictures. With this operation, the wireless terminal 19 can receive the I-pictures early, and therefore a decline in the quality of reconstruction of the video can be prevented.

Figure 2:
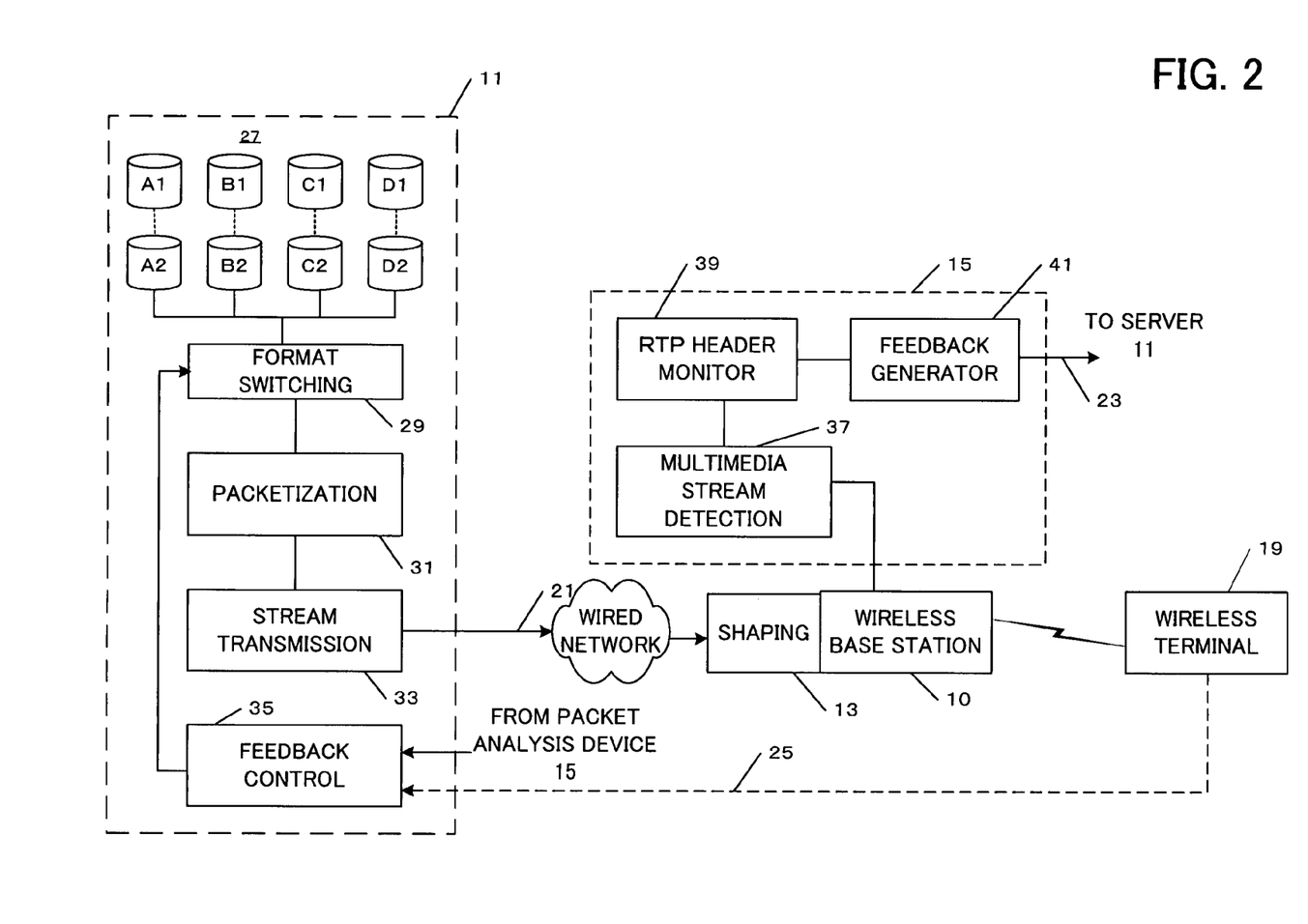
FIG. 2 is a block diagram showing a construction of an embodiment of the present invention.

Referring next to FIG. 2, more detailed explanation is given regarding an embodiment of the present invention. The media delivery device 11 stores video contents A, B, C, and D into a multimedia content database 27 in two different formats. That is, the video A is stored as video contents A1 in a first format, and video contents A2 in a second format. Similarly, the video B is stored as contents B1 in the first format and contents B2 in the second format, and the video C is stored as contents C1 in the first format and contents C2 in the second format.

Figure 5:
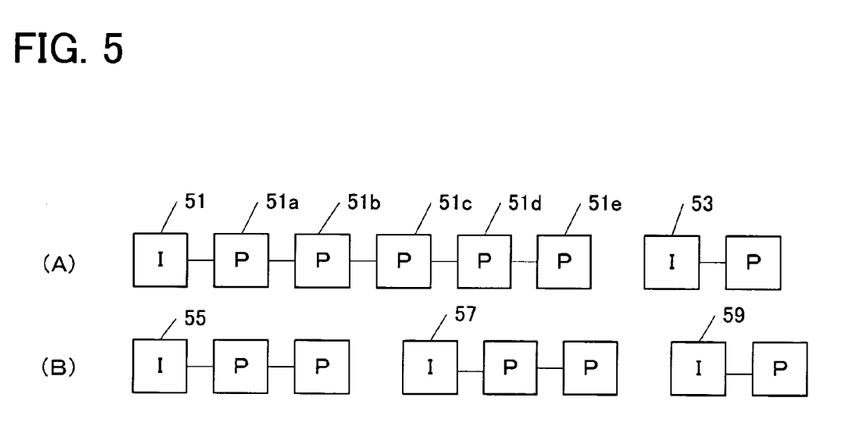
FIG. 5 is a diagram showing examples of MPEG I-picture and P-picture sequences.

FIG. 5 shows examples of the two formats. FIG. 5(A) shows an example of the first format, and FIG. 5(B) shows and example of the second format. The second format is set with a higher I-picture frequency than the first format. In the diagram, I indicates an intra-frame coded I-picture, and P indicates the P-picture that is prediction-coded based on the I-picture. When there is another preceding P-picture between the I-picture and the P-picture, the P-picture is prediction-encoded based on the I-picture and based on the preceding P-picture. In this embodiment, the movies are encoded in accordance with MPEG 4.

According to the MPEG 4 standard, the frames (pictures) of an inputted image is classified into I-pictures, each of which is encoded using information solely on that frame independent of images in the other frames, and P-pictures, each of which is predicted based on an I-picture, and residual prediction error is encoded for transmission.

Figure 4:
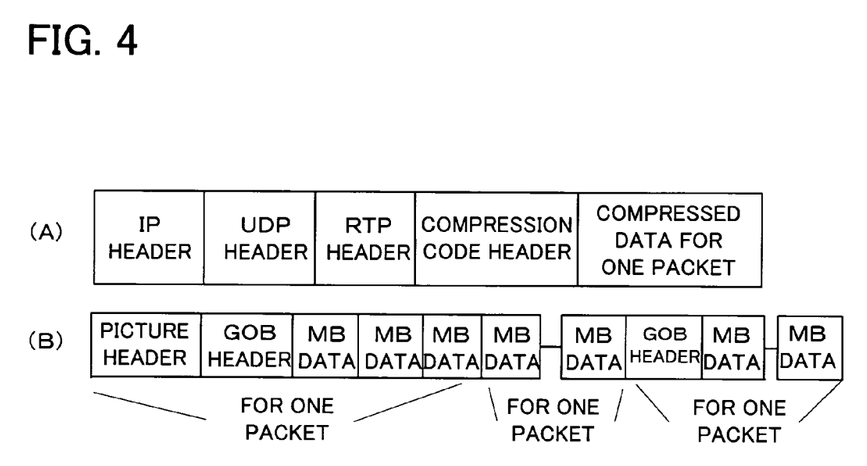
FIG. 4 is a diagram showing examples of video compression coding formats.

The I-picture and the P-picture are each converted by DCT (Discrete Cosine Transform) into DCT coefficients. The DCT coefficients and motion vectors information are entropy coded. At this time, one picture is divided into 8×8-pixel blocks, and DCT is performed on each block. Four adjacent blocks are combined into one macroblock (MB), and multiple macroblocks are combined as one group of blocks (GOB). As shown in FIG. 4(B), multiple macroblocks are placed in one packet and transmitted.

In this embodiment, the media delivery device 11 performs the on-demand multimedia delivery. In the diagram, the video content is only shown, but audio content which will be synchronized with the video and reconstructed is also stored in the database similarly, and is sent in parallel with video content.

A format switching section 29, in response to an instruction from a feedback control section 35, switches the content extracted from the database 27 between the first format and the second format.

A multimedia stream detecting section 37, which is included in the packet analysis device 15, detects the packet containing the RTP header from among the IP packets arriving at the wireless base station 10, and detects the multimedia stream based on the pair of the source address and the destination address, and the pair of the source port number and the destination port number, of the packet. An RTP header monitor section 39 monitors the RTP header contained in the multimedia stream IP packets that are detected by the multimedia stream detecting section 37, and inspects the packet sequence number contained in the RTP header. When loss of a sequence number is detected from inspecting the sequence numbers across multiple packets, the RTP header monitor section 39 transmits information for identifying the lost IP packet to a feedback generator 41. In an embodiment, the information for identifying the IP packet includes the source address, the destination address, and the lost RTP packet's sequence number. Furthermore, in another embodiment, the RTP monitor section 39 transmits not the lost RTP packet's sequence number, but rather the sequence number of an RTP packet each time the RTP packet is detected, to the feedback generator 41.

The feedback generator 41, upon receiving each RTP packet, returns the sequence numbers thereof to the source address as an ACK. In an alternative embodiment, the feedback generator 41, in response to the information transmitted from the RTP header monitor section 39, determines whether the RTP packet is lost within a predetermined period based on the sequence numbers of the sequence of RTP packets, and transmits the sequence number of the lost RTP packet to the source address. In the feedback in this case, the RTCP can be extended and sent as well. These are sent to the wired network 21.

The feedback control section 35 of the media delivery device 11 receives the feedback information from the packet analysis device 15, and in response to reception of the lost packet's sequence number, transmits a media format switching instruction to the format switching section 29. In another embodiment, the feedback control section 35, based on the ACK information that is sent from the packet analysis device 15, monitors lost packet sequence numbers, and when a lost one is detected, transmits the media format switching instruction to the format switching section 29.

In all the embodiments, the feedback control section 35, when it is detected that the packet is lost, transmits the format switching instruction to the format switching section 29. When the lost packet is for a P-picture, the influence is less than in the case of the I-picture. Therefore, if the effect of the switching will be relatively small (e.g., when there are only a few P-pictures before the next I-picture, or the like) the format switching may be omitted.

Now, assuming that the media A1 in the first format is provided to the wireless terminal 19, the format switching section 29 switches the stream to the media A2 which is in the second format. Referring back to FIG. 5(A), in the media A1 steam, it is assumed that what is lost is either one or a plurality of multiple packets containing a macroblock of I-pictures 51, or a packet containing a macroblock of P-pictures 51a. The format switching section 29, in response to the instruction from the feedback control section 35, switches the media to A2 in the second format, and, after the I-picture 51 or P-picture 51a in the media A1 is lost, starts the transmission from the I-picture 57 that appears first in the media A2.

At the wireless terminal 19, since one or more packets of the I-picture 51 or packets of the P-picture 51a are lost, subsequent P-pictures 51b, 51c, 51d, and 51e which are encoded depending upon the I-picture 51 or the P-picture 51a cannot be reconstructed properly. However, the media delivery device 11 switches the media format to the second format where the I-picture frequency is higher, and starts transmission from the I-picture 57 in the second format shown in FIG. 5(B). Therefore, the wireless terminal 19 can properly reconstruct the media from the I-picture 57.

Figure 6:
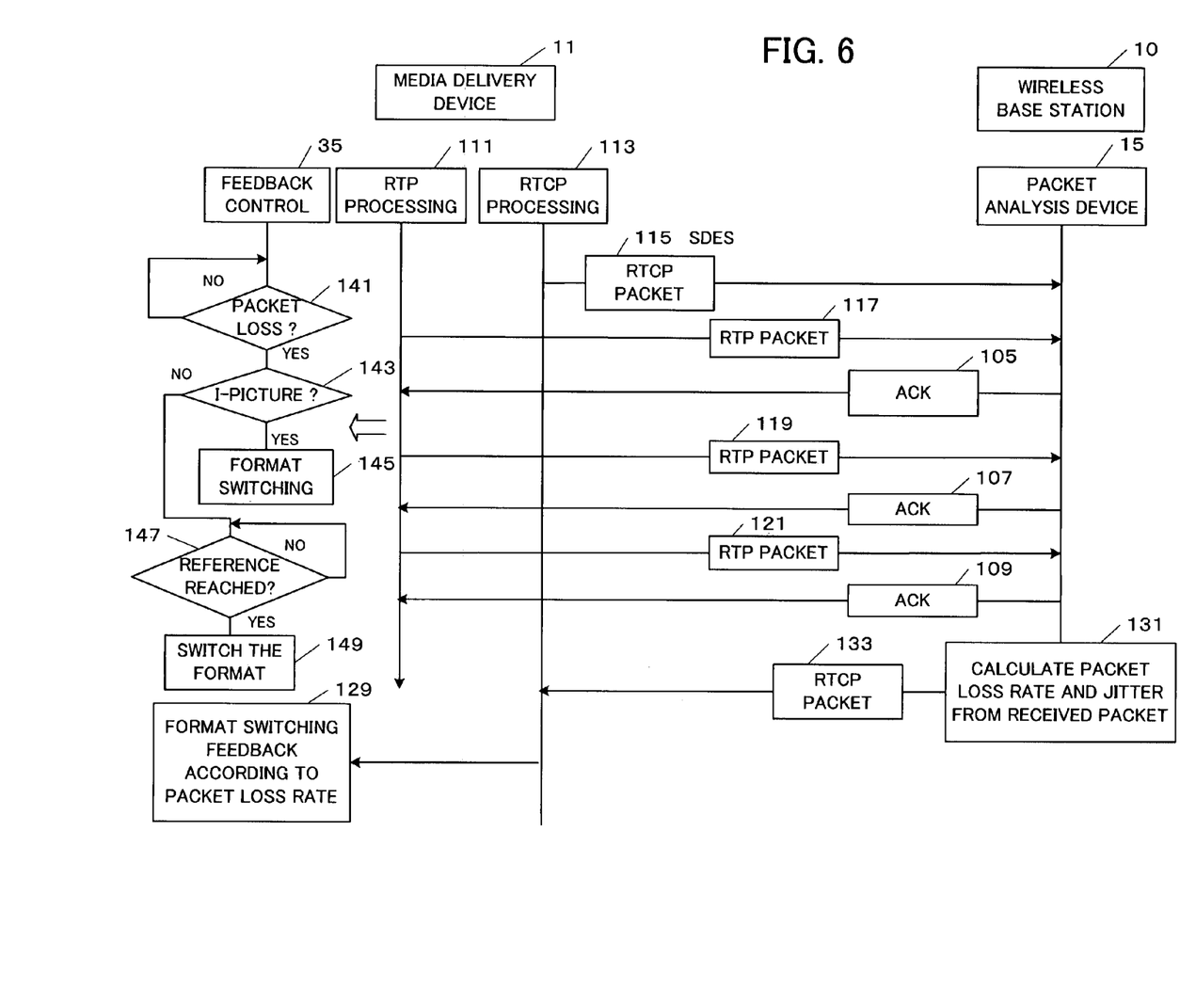
FIG. 6 is a sequence chart showing a communication sequence in accordance with a first embodiment and a second embodiment of the present invention.

FIG. 6 shows an example of communication and processing sequences in the media delivery system in accordance with the present invention.

The content that is extracted from the database 27 is packetized at a packetizing section 31, and is then sent out from a stream transmission section 33 to the wired network 21. Referring to FIG. 6, the stream transmission section 33 executes an RTP processing routine 111 and an RTCP processing routine.

The RTP processing routine adds a compression code header for identifying the format of the compression coding to compressed data corresponding to one packet, and also adds the RTP header, the UDP header and the IP header. FIG. 4(A) shows an example of such a packet format. The RTP header contains the packet sequence number. An initial value of this sequence number is determined with a random number, and serial numbers starting from this initial value are added to each packet. The RTP header contains an SSRC identifier (Synchronization Source identifier). For this identifier the same value is added to multiple streams that should be handled in combination, for example, a voice stream and an image stream of the same user.

The processing routine 111 adds the RTP packet with the RTP header, the UDP header, and the IP header, for transmission according to a UDP/IP protocol. The IP header includes the source address indicating the transmission source, and the destination address indicating the client. Furthermore, the UDP header includes the source port number indicating the port number of the transmission source, and the destination port number indicating the port number of the client.

FIG. 4(B) shows how a picture in one frame is divided into multiple packets and sent in accordance with the MPEG standard. For example, the I-picture, because of its large information volume, is divided into multiple packets and then sent. When much congestion occurs on the network, a portion of the packets of the I-picture may be discarded, and there is a possibility of the complete I-picture not arriving at the wireless terminal 19. In FIG. 4(B), GOB indicates the group of blocks, and MB indicates the macroblock.

The RTCP processing routine 113 exchanges the control information with the network transmitting the RTP packets. The RTCP (Real-Time Transport Control Protocol, RTP Control Protocol) is a protocol that supplements the RTP, where the transmission device and the receiving device notify the control information to each other, whereby flow control, clock synchronization, and synchronization between media such as between audio data and video data are achieved.

In advance of transmission of the RTP-packet, the RTCP processing routine 113 turns the SDES (Source Description) which is a description about the information source into an RTCP packet 115 and transmit it onto the network using the UDP/IP protocol with the IP header and the UDP header added. After this, the RTP processing routine transmits RTP packets 117, 119, and 121 in sequence to the network.

In FIG. 2, a shaping point 13 placed before the wireless base station 10 represents one or a plurality of relay devices which govern flow controls in the wired network on the path from the media delivery device 11 to the wireless base station. The wireless base station 10 is provided with, for example, a layer 3 switch as a counterpart component of the shaping point for buffering the packets received from the wired network 21 at high speed and providing them to the wireless section at a speed adapted for the processing speed of the wireless section of the wireless base station 10.

Referring back to FIG. 6, based on the RTCP packet 115 and the subsequent RTP packets 117, 119, and 121, the packet analysis device 15 of the wireless base station 10 detects that they are parts of the same media stream, and calculates a packet loss rate, jitter and the like (131) from the packets received over a predetermined period. It then puts these pieces of information to an RTCP packet directed to the media delivery device 11, and transmits this packet onto the wired network.

Each time the packet analysis device 15 detects an RTP packet from the same media stream from the media delivery device 11, it transmits a reception acknowledge signal (ACK) containing the sequence number of that RTP packet to the media delivery device 11. In an alternative embodiment, the packet analysis device 15 does not return the ACK each time the RTP packet is received, but monitors if the sequence numbers of the RTP packets belonging to the same media stream are contiguous. When the packet analysis device 15 detects that a sequence number is skipped, it transmits a reception failure signal (NACK) containing the sequence number of the lost RTP packet to the media delivery device 11.

In the RTCP processing routine 113 of the media delivery device 11, when an RTCP packet 133 which is a response to the RTCP packet 115 sent out is received, depending on the packet discard rate and other control information contained therein, the transmission rate of the media stream to be sent out is modified. Furthermore, when the packet loss rate detected in the RTCP processing routine 113 is high, the feedback control routine 35 transmits, to the format switching section 29 (FIG. 2), a control signal to switch the subsequent media stream format to the format with the higher I-picture frequency.

In the RTP processing routine 111 of the media delivery device 11, each time ACK packets 105, 107, and 109 from the wireless base station 10 are received, the sequence numbers, which are contained in the ACK packets, of the RTP packets received from the wireless base station 10, are transferred to the feedback control section 35. The feedback control section 35 inspects whether or not any of the sent packets did not arrive at the wireless base station 10, which is to say whether or not any packets are lost (141). When the feedback control section 35 detects that a packet is lost, the feedback control section 35 then judges whether or not the data contained in that RTP packet is an I-picture (143). When the lost packet is an I-picture, the above-mentioned format switching procedure (145) starts immediately.

At step 143, when it is determined that the lost packet is in a P-picture, it is then determined whether or not the packet is lost up to a reference for retransmission set when a P-picture is lost (147). When the packet of the P-picture is lost, the influence is less than in the case of the I-picture. Therefore, when a predetermined reference value is reached the format is switched (149), and until this reference is reached the format is not switched. For example, the reference may be set so that the format is not switched in the case where there are only a few P-pictures before the next I-picture.

The wireless section of the wireless base station transmits the received IP packet by wireless. The wireless terminal 19 receives the wireless communication and reconstructs the media stream. Transmitting and receiving IP packets by wireless is a publicly known technique, so that detailed explanation thereof is omitted.

Depending on the construction of the wireless terminal 19, the wireless terminal 19 can transmit the ACK signal to the media delivery device 11. Specifically, a wireless terminal that conforms to the 3GPP standard cannot transmit ACK packets as the packet analysis device 15 does. When there is no need to conform with this standard, the wireless terminal can be constructed to transmit ACK packets. The feedback control section 35 compares the feedback information from the packet analysis device 15 with the information from the wireless terminal 19, whereby the quality of the wireless communication from the wireless base station 10 to the wireless terminal 19 can be known. When it is judged that the quality of the wireless communication is low, the feedback control section issues to the format switching section 29 an instruction to switch the media format to the format with the higher frequency of I-pictures. The formats for the media are not only two types. Many types of formats are available, and the format may be switched among many formats depending on the communication status. For example, when transmissions are being performed in a format with a high frequency of I-pictures, if sufficiently good communication status is detected, then the format can be switched to the format with the lower frequency of I-pictures. In this way, the media delivery device 11 can adjust the load of the stream transmission.

Figure 3:
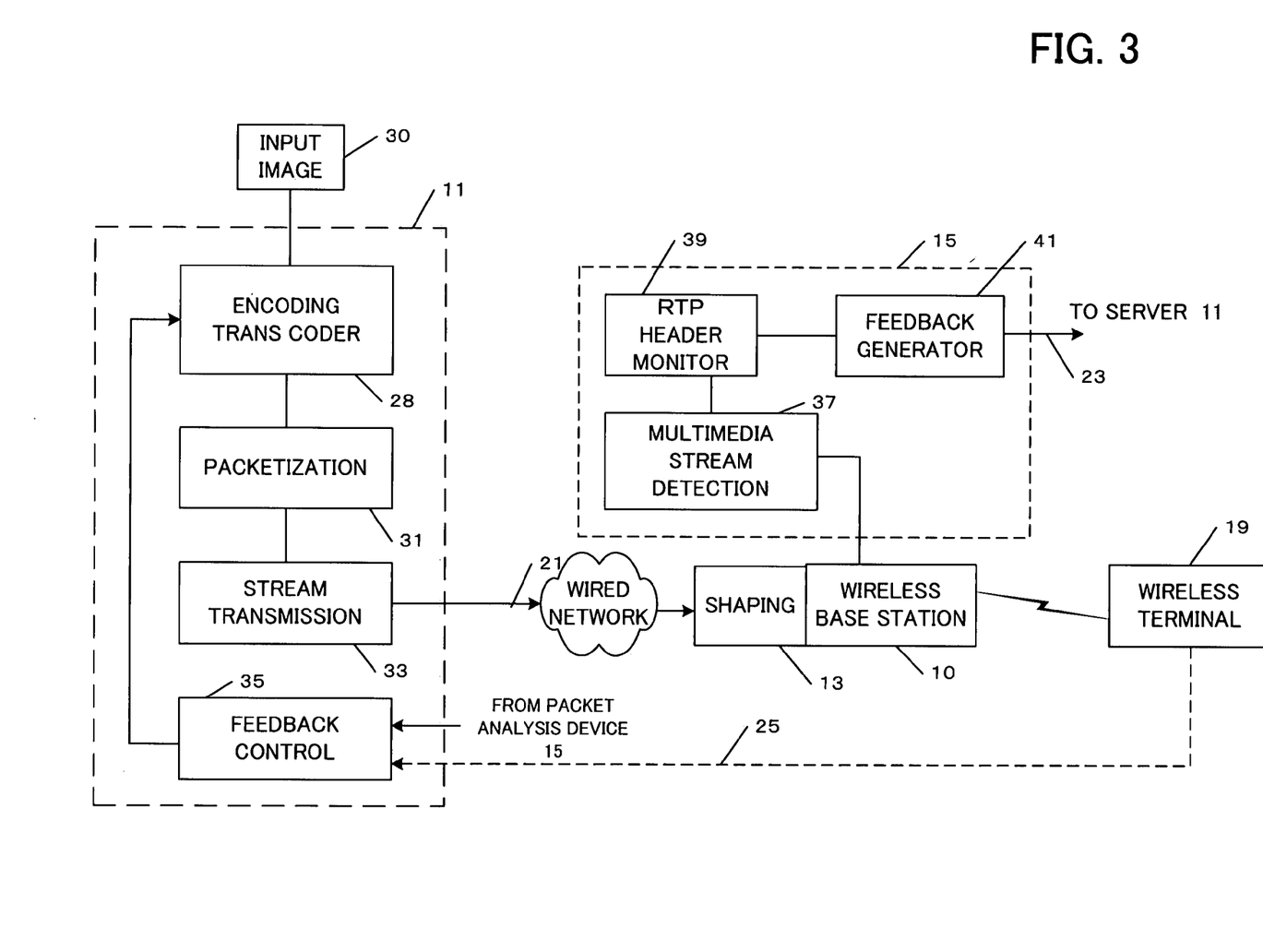
FIG. 3 is a block diagram showing a construction of an alternative embodiment of the present invention.

Referring next to FIG. 3, explanation is given regarding another embodiment of the present invention. In FIG. 3, elements that are similar to the embodiment in FIG. 2 are indicated with the same reference numerals. At the media delivery device 11, inputted images 30 are compressed/encoded in real time by an encoding section 28, and then turned into packets by the packetizing section 31, and then sent to the wired network 21 as the media stream. The inputted images 30 may be images that have been recorded in advance and stored in a storage device, or may be images that are captured in real time using a video camera as in a relay broadcast.

The encoding section 28 encodes the inputted images according to the MPEG4 standard which has already been explained. The encoding section 28 has a transcoding function, which in response to an instruction from the feedback control section 35, modifies the frequency of the I-pictures in the encoding. That is, when, based on the feedback information from the packet analysis device 15, it is detected that packets including a macroblock of I-pictures are lost in the media stream that arrives at the wireless base station 10, the encoding section 28 switches the encoding so as to increase the frequency of the I-pictures.

Next, explanation is given regarding another embodiment for performing retransmission of the lost packet, based on the feedback from the wireless base station.

In the wireless link, delay time is normally long. The time for going back and forth between the media delivery device and the wireless base station, is much shorter than the time for going back and forth between the wireless base station and the wireless terminal client. Therefore, based on the size of the receiving buffer provided to the wireless terminal (i.e., the extent to which packet arrival can be delayed due to retransmission of the packets), when any packet is lost on the wired network from the media delivery device to the wireless base station and in the wireless link from the wireless base station to the wireless terminal, as a form of restoring the lost packet, it is determined whether to retransmit the lost packet on the wired network or wireless link, or to perform forward error correction (FEC), so that the throughput of each communication path can be optimized. FEC is specifically realized by using Reed-Solomon encoding or other error correction encoding commonly known to those skilled in the art. Furthermore, in order to further improve resistance to burst errors, interleaving can be performed, which is also commonly known to those skilled in the art. A commonly known example of using interleaving to improve the ability to correct burst errors is CIRC (Cross Interleaved Reed-Solomon Code) used, for example, for CD-DA.

In order to perform packet retransmission and FEC at their proper times, three modes may be provided as a form of restoring the lost packet on the two communication paths, based on the size of the wireless terminal's receiving buffer. These modes are explained in detail below.

Figure 7:
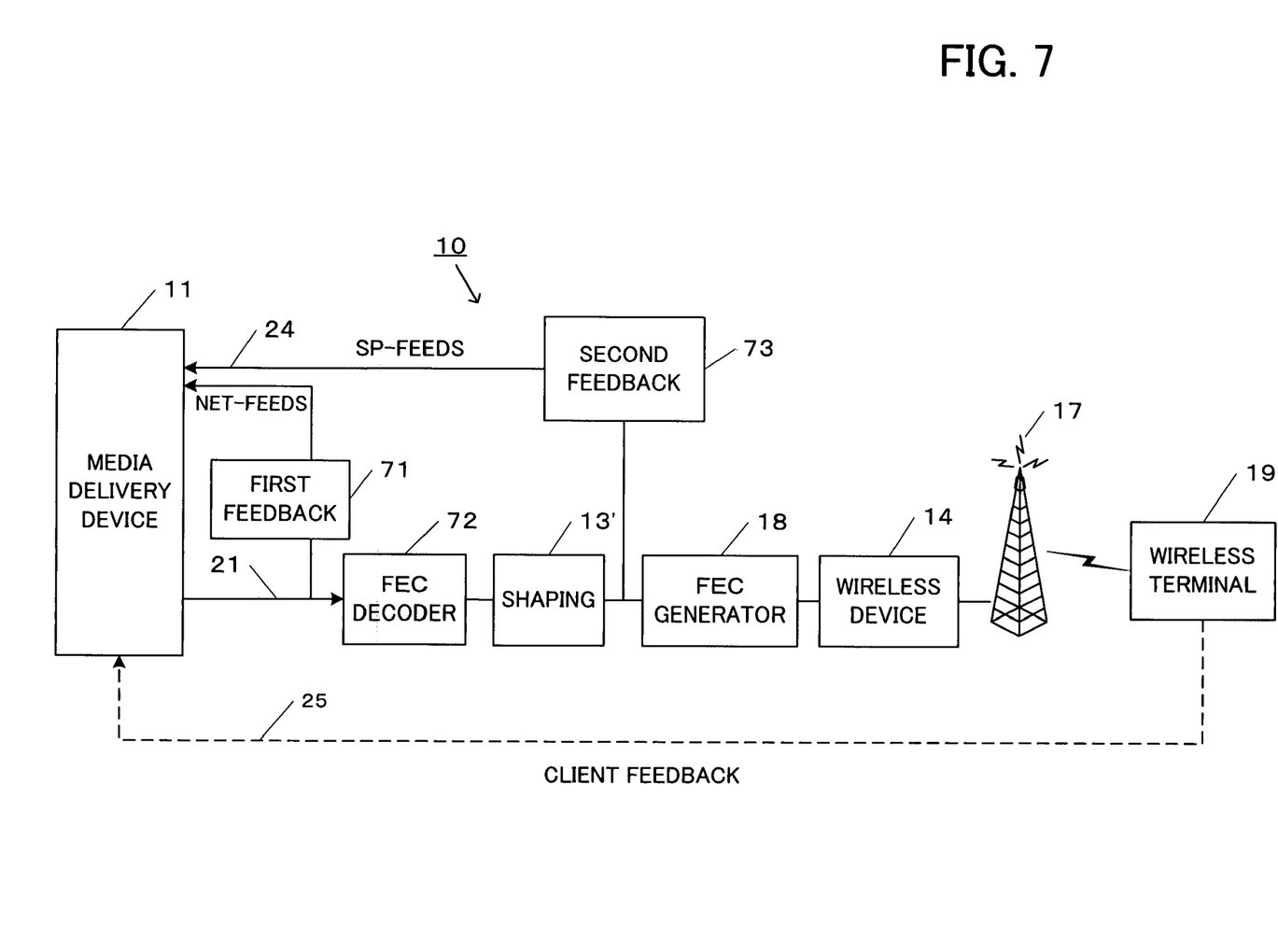
FIG. 7 is a block diagram showing concepts of yet another embodiment of the present invention.

FIG. 7 shows an overall construction of a media stream delivery system provided with such a function. Constituent elements similar to FIGS. 1, 2 and 3 are indicated by the same reference numerals. The wireless base station 101 is provided with a first feedback section 71, an FEC decoder 72, a shaping point 13' that performs flow control at the wireless base station, an FEC generator 18, a second feedback section 73, and a wireless transmission device 14. The FEC decoder 72 functions, in the mode for using FEC to restore the lost packet on the network 21 (Mode 3 explained below), to restore the lost packet using error correction coding information that is sent over on the network 21, and remove error correction code and transmit the main body of the data to the next stage. The shaping point 13', when packets reach in excess of the buffer capacity of the wireless base station 10, discards a portion of the packets. That is, the shaping point 13' is the means for adjusting the rate of packets into the wireless link. The FEC generator 18 functions, in the mode for using the FEC to restore the lost packet on the wireless link between the wireless device 14 and the wireless terminal 19 (Mode 2 and Mode 3 explained below), to generate the error correction code to be attached to the data stream that will be sent over the wireless link.

Figure 8:
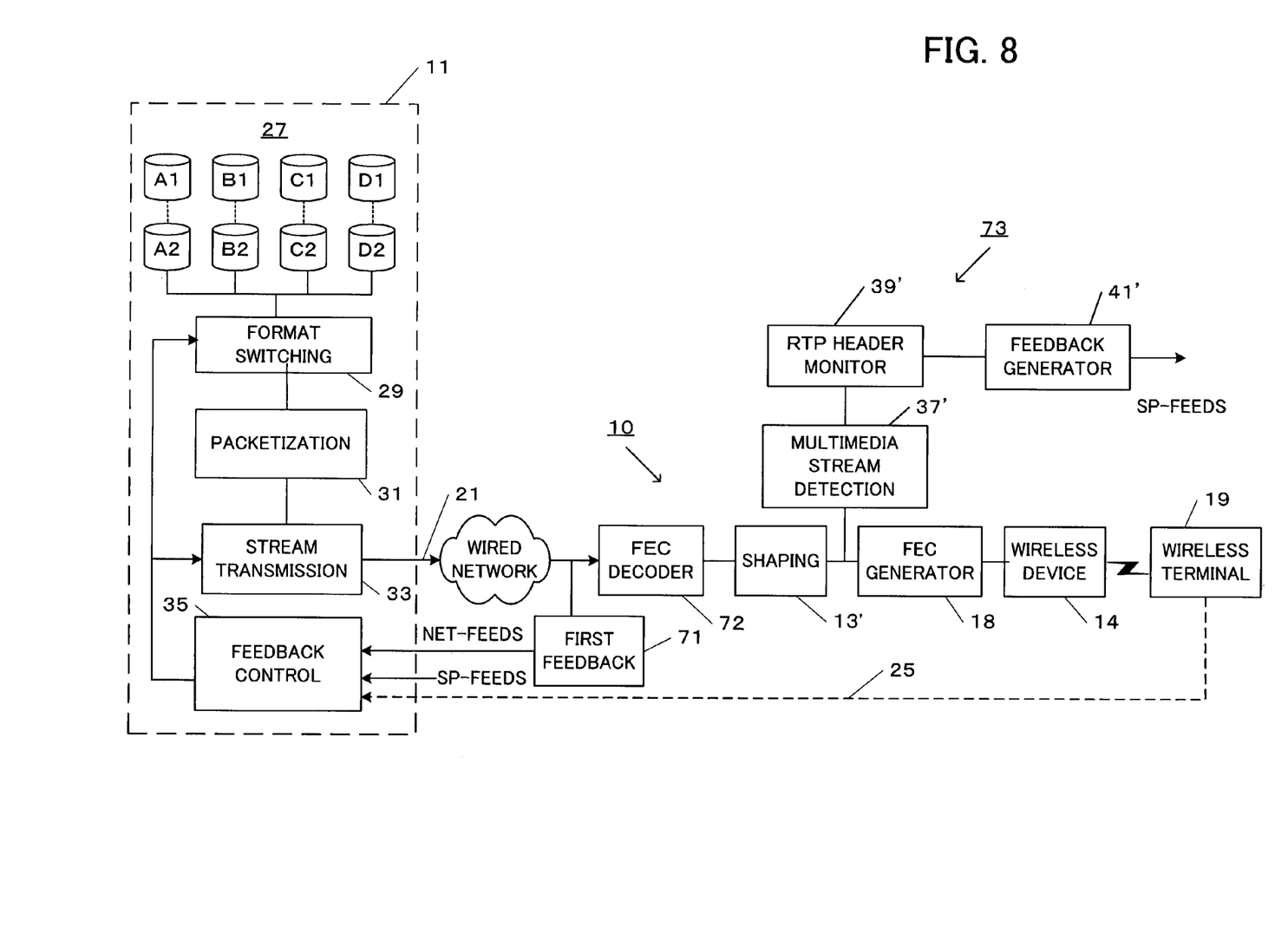
FIG. 8 is a block diagram showing detailed constructions of the embodiment in FIG. 7.

FIG. 8 is a diagram showing an embodiment in a case where, in the system shown in FIG. 7, the media delivery device employs a format switching system. It corresponds to the embodiment in FIG. 2. A multimedia stream detecting section 37' detects the packet containing the RTP header, from among the IP packets arriving at the wireless base station 10, and detects multimedia stream based on the pair of the source address and destination address, and the pair of the source port number and the destination port number, of the packet.

An RTP header monitor section 39' monitors the RTP headers contained in the IP packets of the multimedia stream detected by the multimedia stream detecting section 37', and inspects the sequence numbers of the packets contained in the RTP headers. Based on the inspection of the sequence numbers across multiple packets, when it is discovered that any sequence number is lost, the RTP header monitor section 39' transmits information for identifying the lost IP packet, to the feedback generator 41'. In one embodiment, the information for identifying the IP packet includes the source address, the destination address, and the lost RTP packet's sequence number. Furthermore, in another embodiment, the RTP monitor section 39' does not transmit the sequence number of the lost RTP packet, but transmits the sequence number of each RTP packet that is detected to the feedback generator 41'.

The feedback generator 41' returns the sequence number of the packet to the source address as an ACK upon receiving each RTP packet. In an alternative embodiment, the feedback generator 41', in response to the transfer of the information from the RTP header monitor section 39', judges whether or not there is any lost RTP packet during a predetermined time based on the sequence of RTP packet's sequence numbers, and then transmits the sequence number of the lost RTP packet toward the source address. In yet another alternative embodiment, instead of making a response to the source address each time the individual RTP packets are received or each time the lost RTP packet is found, the response is given with respect to multiple RTP packets at a time. To explain it in more detail, the received/lost data indicating whether each packet was received normally or was lost, is returned for every N number of packets. The number N of packets that are grouped together is determined such that the response delay time falls within such a range that enables retransmission of the packet from the source address in time.

Figure 9:
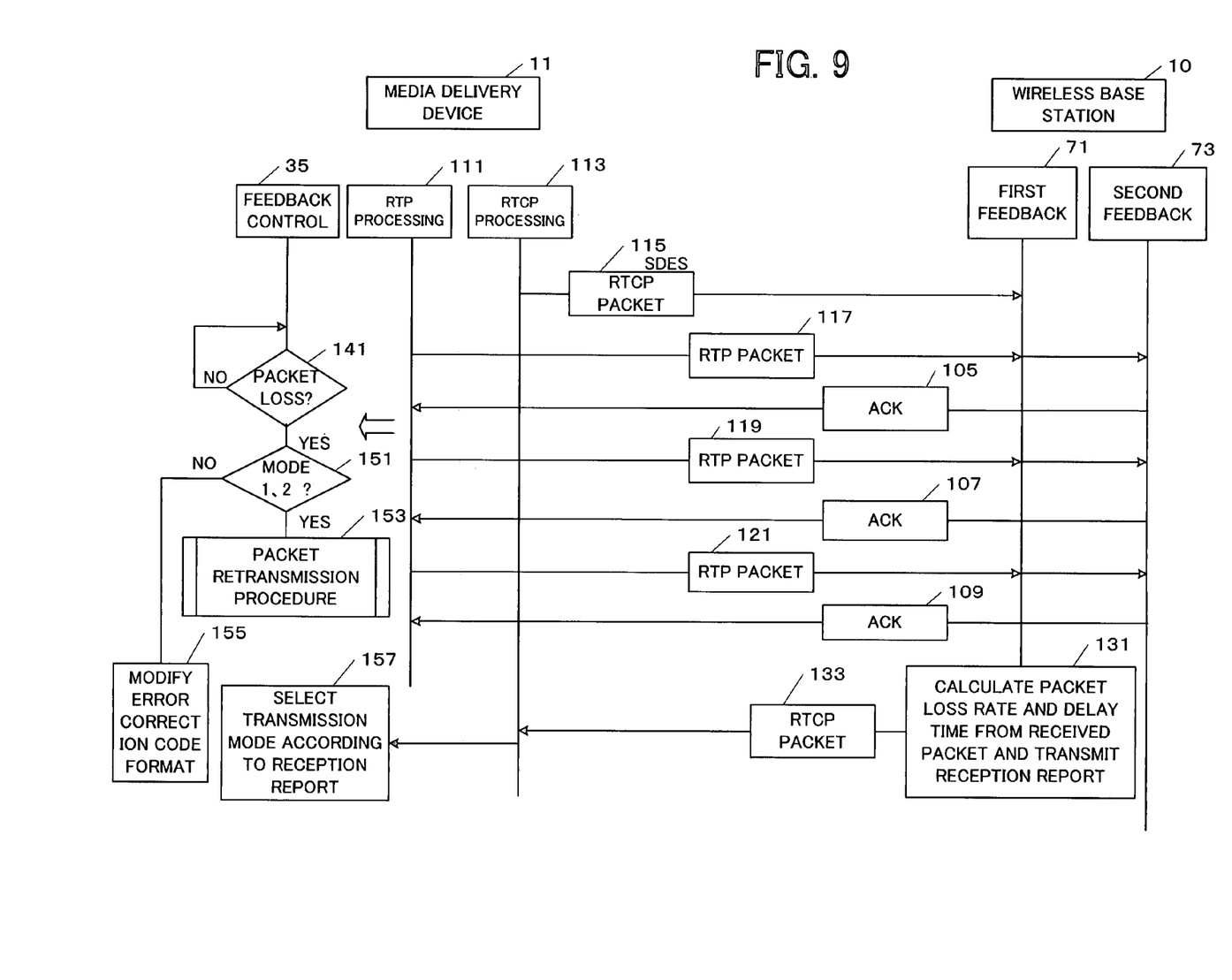
FIG. 9 is a sequence chart showing communication sequences in accordance with a third embodiment of the present invention.

FIG. 9 is a sequence chart showing a communication sequence in the system in FIG. 8. As was explained with reference to FIG. 6, the media delivery device 11 has the RTP processing section 111 and the RTCP processing section 113. The RTCP processing section 113, before transmitting a PTCP packet, sends out the RTCP packet 115 containing sender information (SDES) to the wired network 21 toward the wireless base station 10. The first feedback section 71 of the wireless base station 10, in response to the RTCP packet 115 and the subsequent RTP packets 117, 119, and 121, calculates the packet loss rate and the network transmission delay time of the wired network 21, and then mounts this information onto the RTCP packet 133 and transmits this to the media delivery device.

The second feedback section 73 of the wireless base station 10, upon receiving each RTP packet of the media stream, sends the reception acknowledge signal (ACK) with the sequence number of the RTP packet back to the media delivery device. In FIG. 9, the ACK 105 is returned in response to the reception of the RTP packet 117, the ACK 107 is returned in response to the reception of the RTP packet 119, and the ACK 109 is returned in response to the RTP packet 121. Of course, instead of transmitting the sequence numbers of the packets that were received normally back to the media delivery device as explained with respect to the feedback generator 41' in FIG. 8, the numbers of the lost packets may be sent back, or the arrived/yet unarrived responses may be returned for multiple packets grouped together.

Referring to FIG. 8, the second feedback section 73 is provided with the multimedia stream detecting section 37', the RTP header monitor section 39' and the feedback generator 41'. Functions of each of these sections are the same as those of the multimedia stream detecting section 37, the RTP header monitor section 39 and the feedback generator 41, which are included in the packet analysis device 15 explained with reference to FIGS. 2 and 3.

The RTCP processing section 113 of the media delivery device 11 transfers the packet loss rate and the delay time, which are contained in the RTCP packet 133, to the feedback control section 35. The feedback control section 35 selects the transmission mode for the media stream based on this information (157).

The above-mentioned three modes are explained below, but explanation is first given regarding a method of obtaining parameters that are needed for the media delivery device 11 to determine the transmission rate and the transmission mode for the media stream using two types of feedback, Net-Feeds and SP-Feeds, from the wireless base station 10, and feedback (client feedback) from the wireless terminal 19 represented by a line 25 in FIG. 8.

First, symbols which will be used are defined as follows:
$l_1$ Packet loss rate on the wired network 21
$R^*_1$ Maximum transmission rate permitted on the wired network 21

$R_1$ Transmission rate from the media delivery device 11

$R'_1$ Reception rate at the wireless base station 10

$R_1^{(2)}$ Internal rate in wireless base station, after the FEC decoder 72 eliminates error correction information for FEC, and before packet discard processing is performed at the shaping point 13'

$R_1^{(3)}$ Internal rate in wireless base station after leaving the shaping point 13'

$l_2$ Packet loss rate on the wireless link (i.e., between wireless device 14 and the wireless terminal 19)

$R^*_2$ Maximum transmission rate permitted on the wireless link $R_2$ Transmission rate from the wireless base station 10

$R'_2$ Reception rate at the wireless terminal 19 r Media stream coding rate

Here, the maximum transmission rate $R^*_2$ permitted on the wireless link, R*2, can be determined at the wireless base station 10 by using one of the following two methods.

The first method uses ideal maximum transmission rate information in the process of setting the wireless link. That is, when setting the wireless link, resources assigned to this wireless link, specifically a bandwidth, is determined, so that based on this bandwidth the ideal or maximum possible transmission rate is determined. This value is utilized as $R^*_2$. In this method, the rate used in the session where this wireless link is used, is fixed except in the case where the wireless base station to be used is replaced, such as when the location of the wireless terminal 19 is changed.

The second method is a method of deriving the maximum transmission rate $R^*_2$ based on the filling rate of the transmission buffer in the wireless base station 10 that has the packets that stand ready to be transmitted from the wireless base station 10 to the wireless link. That is, if the transmission buffer's filling rate drops or the buffer keeps empty, then it is understood that the current transmission rate is below the maximum rate and vice versa, if the filling rate is increasing. The rate $R^*_2$ obtained in this way fluctuates depending on the time in many cases.

The maximum transmission rate $R^*_2$ can be determined by, for example, the wireless device 14 in the base station 10, or by a device or the like for controlling the wireless device 14.

The transmission rates of the media delivery device 11 and the wireless base station 10, $R_1$ and $R_2$ (i.e., the rates at the transmission ends), are the rates for all packets relating to the media stream, that is, all packets including not only the main bodies of the data of the media stream but also the packets for FEC which are added thereto, and retransmitted packets. Because of packet loss that can occur on the wired network or on the wireless link, rates at the respective reception ends, $R'_1$ and $R'_2$, drop below the rates at the transmission ends. In other words, the following formula is established.

$R'_1 \leq R_1, R'_2 \leq R_2$

When the packets arrive at the wireless base station 10 from the wired network, first they are given to the FEC decoder 72. If FEC has been applied, then the packets are decoded. As a result, the rate $R_1^{(2)}$ after the packets leave the FEC decoder drops below the reception rate $R'_1$ of the wireless base station.

Here, in the FEC used in this embodiment, the output resulting from applying FEC consists of the original data packet and parity packet. Furthermore, the party packet is sent in a separate stream from the original data packet. Regarding this type of FEC, refer to, for example, RFC2733 (An RTP Payload Format or Generic Forward Error Correction). The FEC decoders (the FEC decoder 72 provided to the wireless base station 10 and the FEC decoder (not shown) provided to the wireless terminal 19) use the parity packet sent in the other stream, to reconstruct the lost original data packet.

Before the packet leaves the wireless base station, the FEC generator 18 compares the rate $R_1^{(3)}$ after leaving the shaping point 13', with the maximum rate $R^*_2$ on the wireless link. If $R_1^{(3)} < R^*_2$, then the FEC generator 18 uses the surplus bandwidth, $R^*_2 - R_1^{(3)}$, for the FEC to restore the packets lost on the wireless link. Eventually, the transmission rate $R_2$ from the wireless base station 10 approaches the maximum transmission rate $R^*_2$ permitted on the wireless link.

The shaping point 13' is provided between the FEC decoder 72 and the FEC generator 18. When the rate $R_1^{(2)}$ after eliminating the FEC on the wired network 21, is greater than the wireless link's bandwidth, that is when it is greater than the maximum rate $R^*_2$, the packet is discarded. Furthermore, duplicate packets having the same RTP sequence numbers can be detected and eliminated here as well.

The two types of feedback, Net-Feeds and SP-Feeds, from the wireless base station 10 to the media delivery device 11, are sent immediately before the FEC decoder 72 and the FEC generator 18, respectively, via the first feedback section 71 and the second feedback section 73.

The first feedback section 71, which performs feedback before the shaping point 13', sends the feedback Net-Feeds to the media delivery device 11, to notify the current status on the wired network. The feedback Net-Feeds is statistical feedback, and includes information collected at a packet window, such as a packet loss rate in a mid-range time frame (e.g., several seconds) and the average and variance of round-trip time. This type of statistical feedback is commonly known. If necessary, refer to, for example, RFC1889 (Rtp: A transport protocol for real-time application).

The second feedback section 73, which performs feedback after the shaping point 13', sends the feedback SP-Feeds in the form of a packet reception acknowledge packet (ACK) to the media delivery device 11, so that the media delivery device 11 can determine which packet is lost before the wireless transmission. The feedback SP-Feeds is sent out in a short period (e.g., within 1 second).

In addition to the feedback Net-Feeds and SP-Feeds, in this embodiment, the wireless terminal 19 also sends out feedback at relatively short intervals with little delay, to the media delivery device 11.

These types of feedback enable the media delivery device 11 to obtain information as listed below.

First, using the feedback Net-Feeds, the media delivery device 11 can know the maximum transmission rate $R^*_1$ permitted on the wired network. Furthermore, the packet loss rate $l_1$ on the wired network is explicitly shown in the feedback Net-Feeds.

The feedback SP-Feeds offers feedback in high resolution at the ends of the wired network, which is to say feedback on the packet basis. Therefore, the media delivery device 11 can accurately grasp which packets have properly arrived at the wireless base station 10.

Furthermore, using the feedback SP-Feeds and the client feedback from the wireless terminal 19, the media delivery device 11 can the obtain packet loss rate $l_2$ on the wireless link, and the maximum transmission rate $R^*_2$ permitted on the wireless link, in the following manner. That is, the feedback SP-Feeds is compared against the client feedback for only the original data packet stream where the parity packet stream for FEC has been eliminated. Thus, the media delivery device 11 can obtain the packet loss rate after the FEC is applied. Furthermore, from the client feedback for the parity packet stream, the media delivery device 11 can grasp how much FEC has been applied on the wireless link, which is to say the bandwidth used for the parity packet stream. If the packet loss rate after the FEC is applied, and the bandwidth for parity packet stream (i.e., the parity packet rate) for the FEC, are both known, then it becomes possible to obtain the "original" loss rate $l_2$ on the wireless link before the FEC is applied.

In this embodiment, the wireless base station 10 automatically selects one of the three modes, based on the delay characteristic required of the media stream, which is to say the receiving buffer capacity of the wireless terminal 19, and then operates. Hereinafter, explanation is given regarding these modes, Mode 1 through Mode 3.

Mode 1

This mode is applied in a case where the wireless terminal 19 (client) is provided with a large receiving buffer, which can allow significant jitter in the packet arrival timing, which is caused by retransmitting lost packets the requisite number of times on the wireless link. Note that, in third-generation mobile phone communication scheme, the wireless base station 10 may set up the wireless terminal 19 so as to retransmit on the link layer as is commonly known to those skilled in the art. Its specific construction or operation itself is not directly relevant to the present invention. If necessary, refer to H. Holma and A. Toskala, Eds., WCDMA for UMTS: Wireless Access for Third Generation Mobile Communications, Wiley, 2001. Therefore, in order to realize Mode 1, a function for retransmitting packets by using third-generation mobile phone link layer can be used. That is, if the wireless base station 10 sets an error control mode for the wireless terminal 19 to the retransmitting mode, then, in a manner that is transparent from the application layer, the link layer will perform operations as follows. That is, at the link layer, when a lost packet is detected at the wireless terminal 19, the wireless terminal 19 requests the wireless base station 10 to retransmit the given packet. When the wireless base station 10 receives the retransmission request, it compares the number of times the given packet has been retransmitted to date, with the maximum number of retransmission times which was set when that mode was set, and then notifies retransmission failure to the wireless terminal 19 in a case where the maximum retransmission times has already been reached. In a case where maximum retransmission times has not been reached yet, the wireless base station 10 retransmits to the wireless terminal 19 one of the already-transmitted packets that is temporarily stored and corresponds to the lost packet. The maximum retransmission times of the lost packet is determined based on the packet loss rate $l_2$ on the wireless link, and a target value for improving the packet loss rate by performing retransmission, but an appropriate or standard value may be known in advance, or the value may be determined by making measurements as described above. The wireless terminal 19 that has received the retransmitted packet, uses the retransmitted packet to restore the media stream. Therefore, in terms of the application layer, the original error control mode was simply set to the retransmitting mode described above, and thus it looks as though the media stream has been received from the wireless base station 10 without any errors. Accordingly, while there is essentially no packet loss in the wireless link from the wireless base station 10 to the wireless terminal 19, a great deal of variation does occur in the packet transmission delay.

Furthermore, using the feedback Net-Feeds from the wireless base station 10, the media delivery device 11 performs congestion control on the wired network.

Furthermore, using the feedback SP-Feeds from the wireless base station 10, the retransmission of the lost packet on the wired network is performed on the application layer. In Mode 1, there are virtually no lost packets on the wireless link, so that the feedback from the wireless base station 10 is substantially the same as the feedback from the wireless terminal, but the feedback SP-Feeds arrives at the media delivery device 11 considerably faster than the feedback from the wireless terminal.

As compared to FEC, where the error correction code is always added, it is more efficient to perform packet retransmission only when a packet is actually lost. In Mode 1, the delay and jitter which accompany packet retransmission, do not become a problem, so that retransmissions, and not FEC, are employed on both the wired network and the wireless link.

Mode 2

This mode is used in a case where the size of the receiving buffer in the wireless terminal 19 is sufficient for the lost packet to be retransmitted the requisite number of times on the wired network, but is not large enough to allow such retransmission on the wireless link.

In Mode 2, when the packet has been lost on the wired network, in a similar fashion to Mode 1, the feedback SP-Feeds from the wireless base station 10 is used by the media delivery device 11 to retransmit the lost packet, and when the packet is lost on the wireless link between the wireless base station 10 and the wireless terminal 19, this is solved by applying FEC.

Normally, the transmission rate on the wireless link is smaller than the wired network 21. Therefore, the typical case is assumed here, that is, $R^*_1 > R^*_2$. As described above, the media delivery device 11 can obtain $R^*_1$, $R^*_1$, and $l_2$ from the feedback information. Accordingly, the media delivery device 11 can appropriately select a media coding rate (i.e., the transmission rate for the media stream) r. The bandwidth $R^*_2 - r$ which is not used for the media stream on the wireless link, resists the loss rate $l_2$ on the wireless link as error correction is performed. Thus, an error correction parity packet stream which is sufficient for restoring virtually all the lost packets can be transmitted.

On the wired network, the surplus bandwidth $R^*_2 - r$ is used, to perform retransmission on the application layer. Furthermore, since duplicate packets are discarded at the wireless base station 10, such packets do not occupy bandwidth on the wireless link.

Mode 3

This mode is applied in a case where, because the buffer capacity of the wireless base station 10 is extremely small, any delay cannot be allowed, which is caused by not only the retransmissions on the wireless link, but also by retransmitting the lost packet the requisite number of times on the wired network.

In Mode 3, the media delivery device 11 applies FEC adapted appropriately for the error rate and other such error characteristics on the wired network, and then sends out the media stream toward the wireless base station 10. The parity stream for this FEC is eliminated by the FEC decoder 72 at the wireless base station 10. The FEC generator 18 then applies another FEC adapted appropriately for the error characteristics of the wireless link, and then sends out to the wireless terminal 19.

Referring back to FIG. 9, the feedback control section 35, based on the RTP packet reception acknowledge signal (ACK) that is sent over from the second feedback section 73, determines whether packets in the media stream are lost (141). When it is detected that a packet is lost, the feedback control section 35 then determines whether or not the communications are being conducted in Mode 1 or Mode 2 (151). When the communications are being conducted in Mode 1 or Mode 2, the packet retransmission procedures explained with respect to the blocks 143, 145, 147, and 149 in FIG. 6 are then executed (153). When the communications are being conducted in Mode 3, if possible and desirable, the error correction code to be used is modified to a more appropriate one (155).

Explanations have been given so far regarding the specific embodiments of the present invention, but the present invention is not limited to the above-mentioned embodiments.

The invention claimed is:

1. A media streaming delivery system, comprising:
  a media delivery apparatus for transmitting a media stream in packets to a network according to a real time transfer protocol;
  a relay apparatus connected to said network for transmitting said media stream to a communication link with a large delay; and
  packet analysis means for monitoring said packet arriving at said relay apparatus and transmitting feedback information indicating a status of said network to said media delivery apparatus;
  wherein said feedback information is a sequence number of a packet lost from said media stream;
  wherein said media stream is a moving image including a sequence of I-pictures and P-pictures; and
  wherein said media delivery apparatus comprises:
    a storage for storing a plurality of media streams for a same moving image, including at least a media stream of a first format that includes I-pictures in a first arrangement and a media stream of a second format that includes I-pictures in a second arrangement which is different from said first arrangement; and
    switching means that in response to a determination of the lost packet with respect to the destination associated with the lost packet, selects a media stream from a plurality of said media streams of at least said first and second formats, the selected media stream being a media stream in which an I-picture appears earliest after the lost packet, and for sending the selected media stream to said destination.

2. The delivery system according to claim 1, wherein said feedback information is an acknowledge response sent to said relay apparatus each time a packet of said media stream arrives.

3. The delivery system according to claim 1, wherein said communication link with a large delay is a wireless link.

4. The system according to claim 3,
  wherein said media delivery apparatus comprises an encoding device for generating said media stream; and
  wherein said encoding device is arranged to generate a media stream starting with an I-picture in response to determination of said packet loss.

5. A media delivery apparatus used for delivering a media stream comprising a sequence of packets,
  wherein said apparatus, in response to feedback relating to packet loss on a delivery path of a media stream, is configured to modify said media stream so as to reduce an influence of said packet loss;
  wherein said media stream is a moving image including a sequence of I-pictures and P-pictures, said media delivery apparatus comprising:
  a storage for storing a plurality of media streams for a same moving image, said plurality of media streams including at least a first media stream of a first format that includes I-pictures in a first arrangement, and a second media stream of a second format that includes I-pictures in a second arrangement which is different from said first arrangement; and
  switching means for responding to a determination of said packet loss with respect to a destination in which said packet loss has occurred, the switching means configured to select a media stream among said plurality of media streams, in which an I-picture appears earliest after said packet loss, and for sending the selected media stream to said destination.

6. The media delivery apparatus according to claim 5,
  wherein said media stream is a video including a sequence of I-pictures and P-pictures;
  wherein said media delivery apparatus comprises an encoding device for generating said media stream; and
  wherein said encoding device is configured to generate a media stream starting with an I-picture in response to determination of said packet loss.

7. The media delivery apparatus according to claim 6, wherein said feedback relating to packet loss is feedback relating to said packet loss observed at a point where said delivery path switches from a link with a small delay to a link with a large delay.

8. The media delivery apparatus according to claim 7, wherein said link with a small delay is a wired link and said link with a large delay is a wireless link.

9. The media delivery apparatus according to claim 6, wherein said encoding device is arranged such that, in response to detection of a packet loss based on feedback information from said packet analysis apparatus, said encoding device increases a frequency of I-pictures at least for a media stream transmitted to a destination for which said loss has occurred.

10. The media delivery apparatus according to claim 6, wherein said encoding device is arranged such that, in response to detection of said packet loss based on feedback information from said packet analysis apparatus, said encoding device transmits a media stream starting with an I-picture to the destination for which said packet loss has occurred.

11. The media delivery apparatus according to claim 8, wherein said media delivery apparatus performs retransmission of a packet based on feedback information relating to the packet loss.

12. A media streaming delivery method, comprising:
  transmitting a media stream in packets from a first device to a network according to a real time transfer protocol;
  relaying said media stream from the network to a communication link with a large delay by using a second device; and
  monitoring said packets as they arrive at said second device and transmitting feedback information indicating the status of said network to said first device;
  said media stream includes a video including a sequence of I-pictures and P-pictures; and
  said first device performing the steps of:
    storing a plurality of media streams for one video, including at least a first media stream including I-pictures in a first arrangement and a second media stream including I-pictures in a second arrangement which is different from said first arrangement; and
    responding to a lost packet by
    (a) selecting a media stream in which a first I-picture after the picture in said lost packet appears earliest among said plurality of media streams, and
    (b) switching the media stream to be sent to said selected media stream, the selecting and switching steps being performed for the destination for which said loss lost packet occurred.

13. The delivery method according to claim 12, wherein said feedback information is an acknowledge response sent to said second device each time a packet of said media stream arrives at the second device.

14. The delivery method according to claim 12, wherein said feedback information is a sequence number of a packet lost from said media stream.

15. The delivery method according to claim 13, further including modifying said media stream transmitted from the first device based on said feedback information.

16. The delivery method according to claim 15, wherein said communication link with a large delay is a wireless link.

17. The method according to claim 12, wherein said media stream includes a video having a sequence of I-pictures and P-pictures, the method further comprising:

generating a media stream starting with an I-picture in response to said lost packet; and retransmitting the generated media stream based on a acknowledge response received over said wireless link.

* * * * *